United States Patent [19]

Leppich

[11] 4,083,437
[45] Apr. 11, 1978

[54] SHOCK ABSORBER VALVE
[75] Inventor: Erhard Leppich, Wolfsburg, Germany
[73] Assignee: Volkswagenwerk Aktiengesellschaft, Germany
[21] Appl. No.: 776,537
[22] Filed: Mar. 11, 1977
[30] Foreign Application Priority Data
 Apr. 15, 1976 Germany .............................. 2616897
[51] Int. Cl.² ............................................. F16F 9/348
[52] U.S. Cl. .................................. 188/322; 137/493.8; 137/512.5
[58] Field of Search ....................... 188/322, 314, 315; 137/493.8, 512.5

[56] References Cited
U.S. PATENT DOCUMENTS

| 2,500,708 | 3/1950 | Rossman | 188/315 |
| 3,874,487 | 4/1975 | Keijzer et al. | 188/322 |

FOREIGN PATENT DOCUMENTS

| 214,919 | 12/1956 | Australia | 188/314 |
| 833,574 | 2/1972 | Germany | 188/322 |
| 1,736,883 | 10/1956 | Germany | 188/322 |

Primary Examiner—Trygve M. Blix
Assistant Examiner—Edward R. Kazenske

[57] ABSTRACT

A hydraulic shock absorber is disclosed which includes a stationary cylinder, a piston arranged to move within the cylinder in directions of extension and retraction, a fluid tank and a multiple valve for controlling the flow of fluid between the cylinder and the tank. The multiple valve comprises a stationary valve partition element having openings forming parts of two ducts for the flow of fluid during piston extension and retraction, respectively; a thrust collar, arranged adjacent and movable axially with respect to the partition element, having openings forming parts of the two ducts; a tie rod extending through one of the ducts; a valve plate retained at one end of the tie rod against the thrust collar and forming the closing body of a suction valve with respect to the thrust collar for a flow of fluid through the one duct; a closing coil spring retained at the opposite end of the tie rod; a ring plate resiliently retained by the coil spring against the partition element and forming the closing body of an auxiliary valve with respect to the partition element for the flow of fluid through the other duct; and at least one flat spring disc arranged between the partition element and the thrust collar forming the closing body of a working valve with respect to the thrust collar for the flow of fluid through the other duct. The working valve determines the operating characteristic of the shock absorber while the auxiliary valve opens only during piston retraction.

5 Claims, 1 Drawing Figure

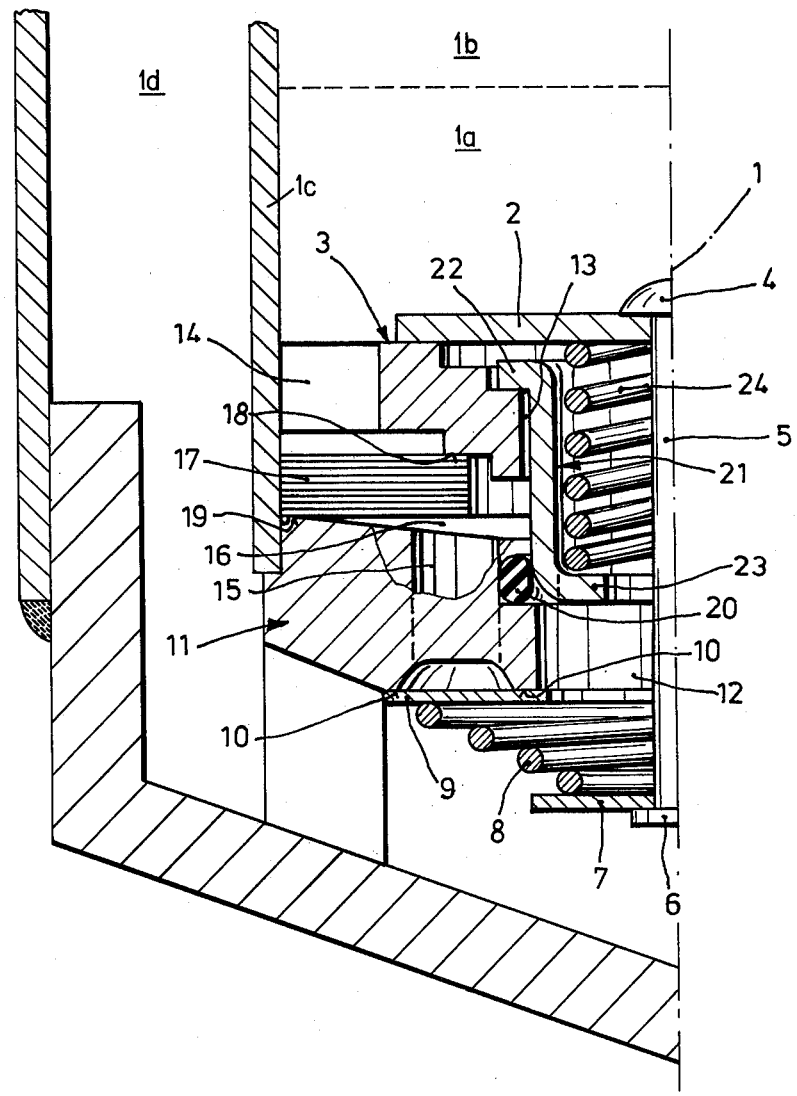

SHOCK ABSORBER VALVE

BACKGROUND OF THE INVENTION

The present invention concerns a control valve arrangement for a hydraulic shock absorber which may be used, for example, in a motor vehicle suspension system. More particularly, the invention relates to a fluid control valve for a shock absorber of the type disclosed in the German Pat. No. 833,574.

The German Pat. No. 833,574 discloses a shock absorber having a bottom valve arrangement with separate ducts for the two directions of flow between the cylinder and the surrounding fluid tank. This construction offers the advantage that any foam possibly forming in the region of the ducts can rapidly be swept away. In addition, the series arrangement of a working valve and an auxiliary check valve in the duct which passes fluid in the operating direction during piston retraction makes it possible to reduce the hysteresis of the shock absorber to a very low valve. Moreover, the auxiliary valve delays the withdrawal of fluid from the working chamber within the cylinder.

The construction of the bottom valve arrangement with a suction valve in one duct and a working valve and an auxiliary valve in the other, as described in the aforementioned patent specification, requires a complex partition element which must form all three valve seats and must secure the plate spring discs forming the two valves that are effective in the operating direction. In order to mount the various valve bodies in the partition, two flanging processes are required which necessitate relatively complicated supporting elements because of the positions of the supporting surfaces or supporting edges. If one of the flanges is removed, for example to facilitate repair, this complexly constructed partition element has to be discarded and replaced.

As mentioned above, the plate springs in this known type of shock absorber which constitute the two valve bodies are clamped over a given radially-extending area so that they are subjected to considerable bending stress during operation and may prematurely fail.

All of these shortcomings render the known construction of the shock absorber control valve unfit for practical use. Therefore, it is an object of the invention to provide a control valve arrangement for a shock absorber of the type described above which has the same fundamental advantages but which is substantially simpler with respect to construction and assembly and is less susceptable to failure.

SUMMARY OF THE INVENTION

This object, as well as other objects and advantages which will become apparent in the discussion that follows, are achieved, according to the invention by providing a multiple valve for controlling the flow of fluid between the shock absorber cylinder and tank which comprises (1) a stationary valve partition element having openings forming parts of two ducts for the flow of fluid during piston extension and retraction, respectively; (2) a thrust collar, arranged adjacent and movable axially with respect to the partition element, having openings forming parts of the two ducts; (3) a tie rod extending through one of the ducts; (4) a valve plate retained at one end of the tie rod against the thrust collar and forming the closing body of a suction valve with respect to the thrust collar for the flow of fluid through the one duct; (5) a closing coil spring retained at the opposite end of the tie rod; (6) a ring plate resiliently retained by the coil spring against the partition element and forming the closing body of an auxiliary valve with respect to the partition element for the flow of fluid through the other duct; and (7) at least one flat spring disc arranged between the partition element and the thrust collar forming the closing body of a working valve with respect to the thrust collar for the flow of fluid through the other duct. The working valve determines, at least largely, the operating characteristic of the shock absorber while the auxiliary valve is a check valve in series with the working valve which opens only upon application of fluid pressure during piston retraction.

The invention thus requires the use of flat spring discs only for the closing body of the working valve. By suitable choice of the number and the individual properties of these flat spring discs, and by providing suitable openings as bypasses therefor it becomes possible to individually adjust the operating characteristic of the shock absorber. On the other hand, the closing body of the suction valve may be constituted by a low-cost and robust valve plate or valve collar.

In accordance with the invention, the flat spring discs are not clamped over a given radially-extending area as in the shock absorber disclosed in the aforementioned German Pat. No. 833,574. Rather, they bear on a contact circle located approximately in the region of their outer radius thus ensuring freedom of movement. When the working valve is opened, the mounting support of the flat spring discs exerts practically no bending moment thereon.

An important advantage of the invention over the initially discussed state of the art is attributable to the fact that the entire arrangement is held together by the tie rod which, for example, may be flanged at its ends so as to hold together the individual parts in opposition to the force of the coil spring. Thus, if the shock absorber must be refinished in production or repaired in the field, it is sufficient to remove one of these flanges so that only the low-cost tie rod has to be replaced.

As a rule, the thrust collar will not be fixed on the cylinder of the shock absorber in axial direction. However, in order for the thrust collar to be supported against the flat spring discs even when the suction valve is open (the collar being otherwise pressed down by the suction valve closing body against the flat spring discs) a second spring may be provided, in accordance with a particular feature of the invention, which acts in opposition to the aforementioned coil spring and accordingly makes it possible to adjust different opening forces for the suction valve and the auxiliary valve.

For a better understanding of the invention, together with other and further objects, reference is made to the following description, taken in conjunction with the accompanying drawings, and its scope will be pointed out in the appended claims.

BRIEF DESCRIPTION OF THE DRAWING

The single FIGURE is a longitudinal cross-sectional view of the lower portion of a hydraulic shock absorber showing the preferred embodiment of the control valve according to the present invention.

DESCRIPTION OF THE PREFERRED EMBODIMENT

Since the shock absorber is symmetrically constructed, the FIGURE shows only the part of the shock absorber to the left of the longitudinal axis 1.

Immediately above the control valve arrangement illustrated in the FIGURE is the working chamber 1a of the shock absorber which contains the shock absorber working fluid. This fluid is under a pressure which is essentially a function of the direction of motion of the piston, represented at 1g, within the stationary cylinder 1c. If the piston moves in the direction of extension, which is upward in the FIGURE, working fluid must be drawn from the fluid tank 1d via the control valve. In particular, fluid flows upward in this case through the suction valve formed by a valve plate 2 which, in the closed condition of the suction valve shown in the FIGURE, is supported on a thrust collar 3. The valve plate 2 is retained by a flange 4 on a tie rod 5 to ensure proper closing of the suction valve. As shown in the FIGURE, the tie rod is also provided with a flange 6 at its lower end to retain a flat disc 7. This flat disc serves as support for a coil spring 8, in this case a conically-shaped helical spring, which constitutes the closing spring for the suction valve 2, 3. Moreover, this coil spring is also the closing spring for an auxiliary valve designed to open only in the working direction, during piston retraction, comprising a ring plate-type closing body 9 which collaborates with a valve seat formed by ring surfaces 10 of a stationary partition element 11 in the shock absorber.

As may be seen, the partition element 11 maintains or supports the entire control valve arrangement in the axial direction and is provided with a center opening 12 which, together with a corresponding center opening 13 in the thrust collar 3, forms a first duct or channel for the shock absorber fluid. The fluid flows through this channel due to suction when the shock absorber piston moves in the direction of extension.

Several second openings, offset outwardly in the radial direction from the center opening, form a second duct or channel and serve the flow of shock absorber fluid in the opposite or working direction when the shock absorber piston is moved in the direction of retraction. Only one of these second openings is discernible in the longitudinal section drawing; namely, the opening 14 in the thrust collar 3 and the opening 15 in the stationary partition element 11. An annular space 16 connecting the openings 14 and 15 contains the closing body 17 of a working valve formed by a stack of annular plate springs or spring discs. As may be seen, the coil spring 8 and the tie rod 5 draw the valve plate 2 and the thrust collar 3 downward so that the latter lies flat against the uppermost spring disc forming the valve seat 18. The spring discs, in turn, are drawn downward against a contact circle 19 on the otherwise sloping (oblique) surface of the stationary partition element 11. This arrangement provides an articulated amount for the closing body 17 of the working valve thus facilitating opening to permit the flow of fluid in the downward (operating) direction.

In the exemplary embodiment shown in the FIGURE, the thrust collar 3, which is not otherwise secured in axial direction, serves its hold-down function even when the suction valve 2, 3 is open. The thrust collar is assisted in this function by a seal 20 and a tube 21 which seal the first duct from the passage of fluid radially outward. The tube 21 is provided with an outwardly-directed collar 22 at its upper end that pulls the thrust collar 3 downward, and with inwardly-directed projections 23 at its bottom end forming a bearing surface for an additional coil spring 24. The upper end of this coil spring, which is formed as a helix, pushes against the valve plate 2 of the suction valve thereby counteracting the force of the conical coil spring 8 so as to decrease the required opening pressure for the suction valve. Since the helical coil spring 24 does not influence the force required to open the auxiliary valve 9, 10 (this force is determined solely by the design of the conical spring 8), the present invention makes it possible to design the suction valve 2, 3 and the auxiliary valve 9, 10, with different opening forces.

The invention also exhibits the advantages that (1) only small masses are moved, thereby decreasing the possibility of rattling, and (2) the structure may be easily repaired. If repair is required, only one of the flanges 4 or 6 (or also a suitable screw connection) need be removed so that, at most, only the tie rod 5 need be thrown away. Finally, unlike the partition element of the previously known shock absorber valve described in the "Background of the Invention" section above, the partition element 11 in the control valve arrangement according to the present invention has no parts with complicated shapes requiring adherence to a plurality of tolerances.

While there has been described what is believed to be the preferred embodiment of the invention, those skilled in the art will recognize that various changes and modifications may be made thereto without departing from the spirit of the invention, and it is intended to claim all such embodiments as fall within the true scope of the invention.

I claim:

1. In a hydraulic shock absorber including a stationary cylinder, a piston arranged to move within said cylinder in directions of extension and retraction, and a fluid tank; the improvement comprising valve means for controlling the flow of fluid between said cylinder and said tank, said valve means including:
   a. a stationary valve partition element having an axially extending first opening forming part of a first duct for the flow of fluid in one direction during piston extension and having an axially extending second opening, radially offset from said first opening, forming part of a second duct for the flow of fluid in the opposite direction during piston retraction;
   b. a thrust collar, arranged adjacent said partition element and movable axially with respect thereto, said thrust collar having a first opening forming a part of said first duct and a second opening forming a part of said second duct;
   c. a tie rod, extending through said first duct;
   d. a valve plate retained at one end of said tie rod against said thrust collar and forming the closing body of a suction valve with respect to said thrust collar for the flow of fluid through said first duct;
   e. a first coil spring retained at the opposite end of said tie rod;
   f. a ring plate resiliently retained by said first coil spring against said partition element and forming the closing body of an auxiliary valve with respect to said partition element for the flow of fluid through said second duct; and
   g. at least one flat spring disc arranged between said partition element and said thrust collar and forming the closing body of a working valve with respect to said thrust collar for the flow of fluid through said second duct, said at least one spring disc bearing against a contact circle of said partition element on the side thereof opposite said ring plate;

whereby said working valve determines the operating characteristic of said shock absorber and said auxiliary valve is a check valve in series therewith which opens only upon application of fluid pressure in said opposite direction during piston retraction.

2. The improvement defined in claim 1, wherein said valve means further includes a flat disc retained at said opposite end of said tie rod for holding said first coil spring.

3. The improvement defined in claim 1, wherein said valve means further includes:
 a. a tubular member inserted in said first duct, sealing said first duct from the passage of fluid radially outward and retaining said thrust collar in the direction of said at least one spring disc when said suction valve is open; and
 b. a second coil spring arranged in said tubular member, the end of said second coil spring facing said first coil spring being retained by said tubular member and the opposite end of said second coil spring bearing against said valve plate.

4. The improvement defined in claim 3, wherein said second coil spring is a cylindrically-shaped helical spring.

5. The improvement defined in claim 1, wherein said first coil spring is a cone-shaped helical spring.

* * * * *